United States Patent

Fuchs et al.

[11] Patent Number: 5,966,990
[45] Date of Patent: Oct. 19, 1999

[54] SHIFTING ARRANGEMENT FOR, AND METHOD OF SHIFTING, A MANUAL TRANSMISSION

[75] Inventors: Robert Fuchs, Wiernsheim; Edmund Sander, Leonberg, both of Germany

[73] Assignee: Dr. Ing. h.c.F. Porsche AG, Weissach, Germany

[21] Appl. No.: 08/741,515

[22] Filed: Oct. 31, 1996

[30] Foreign Application Priority Data

Oct. 31, 1995 [DE] Germany .......................... 195 40 522

[51] Int. Cl.⁶ .................................................. F16H 61/18
[52] U.S. Cl. .................. 74/337.5; 74/473.22; 74/473.27
[58] Field of Search .................................. 74/335, 337.5, 74/473 R, 475, 476, 473.22, 473.27

[56] References Cited

U.S. PATENT DOCUMENTS

| | | | |
|---|---|---|---|
| 4,879,919 | 11/1989 | Sekizaki | 74/337.5 |
| 4,991,454 | 2/1991 | Bulgrien | 74/335 |
| 5,365,800 | 11/1994 | Muller | 74/337.5 X |
| 5,433,125 | 7/1995 | Müller | 74/477 |

FOREIGN PATENT DOCUMENTS

| | | |
|---|---|---|
| 0 448 526 | 9/1991 | European Pat. Off. . |
| 1 184 665 | 12/1964 | Germany . |
| 42 28 797 | 3/1994 | Germany . |
| 44 27 076 | 1/1996 | Germany . |
| 2 129 074 | 5/1984 | United Kingdom . |

*Primary Examiner*—Rodney H. Bonck
*Assistant Examiner*—Troy Grabow
*Attorney, Agent, or Firm*—Evenson, McKeown, Edwards & Lenahan, P.L.L.C.

[57] ABSTRACT

A shifting arrangement for a manual transmission having several forward gears and at least one reverse gear has a shift rotor that is rotated to shift the transmission gears. For this purpose, the shift rotor is connected by way of a cable pull with a shift lever. By moving the shift lever forward or backward from a neutral position, the shift rotor is rotated by way of a step-by-step system. In order to ensure a secure shifting of the reverse gear with a clear assignment for the driver and a protection against an unintended shifting, the reverse gear is operated by moving the shift lever in a second channel which is separate from the forward-gear shifting channel. For this purpose, the shift lever is connected by way of a second cable pull with a preselection shaft. By rotating the preselection shaft, coupling elements can be adjusted between the shift forks and the shift rotor irrespective of their shifting position. By means of the locking elements between the shifting shaft and the preselection shaft, a shifting of individual transmission gears is allowed only if a previously defined shifting position existed.

16 Claims, 5 Drawing Sheets

SHIFTING ARRANGEMENT FOR, AND METHOD OF SHIFTING, A MANUAL TRANSMISSION

BACKGROUND AND SUMMARY OF THE INVENTION

This invention is directed to a shifting arrangement for, and a method of shifting, a manual transmission, and more particularly to a shifting arrangement having a shift rotor which can adjust shifting elements by way of coupling elements.

A shifting arrangement of this type is described, for example, in Mueller (U.S. Pat. No. 5,433,125) and has a shift rotor whose rotation shifts six forward gears and one reverse gear. The shift rotor is provided with guideways in which intermediate elements engage which interact with shift forks in a manner known per se. By means of the longitudinally guided intermediate elements, the rotating movement of the shift rotor is converted into a longitudinal movement of the shift forks. The rotating movement of the shift rotor is triggered by a step-by-step system which is connected with the shift lever of the motor vehicle. For shifting the forward gears and the reverse gear, the shift lever is moved in a single shifting channel. By moving the shift lever from a central neutral position into a shifting direction, an upshifting is triggered and by moving the shift lever from the neutral position into the opposite direction, a downshifting is triggered. In order to prevent an unintended shifting from the first gear into the reverse gear, a locking device arranged on the shift lever is provided which, by way of a cable pull, acts upon a detent pawl on the shift rotor. Furthermore, the manual transmission can be brought from each shifting position into a neutral shifting position by a transverse movement of the shift lever. In this case, a shift fork, which cooperates in the shifting of all transmission gears including the reverse gear, is provided with a swivellable coupling element which can be swivelled out of the guide of the intermediate element and can be brought into a neutral position by means of an additional guide. This swivelling out takes place by means of a servo motor which cooperates in each shifting operation and in the transverse movement of the shift lever.

An object of the present invention is to improve a shifting arrangement and method of the type generally described above such that the protection against an unintentional engagement of the reverse gear is increased and simultaneously the entire shifting arrangement can be operated without servo motors.

This and other objects have been achieved according to the present invention by providing a shifting arrangement for a manual transmission having a plurality of forward gears and at least one reverse gear, the shifting arrangement comprising: a shift lever movable in a first shifting channel, movable in a second shifting channel, and movable between the first and second shifting channels, at least the reverse gear being shifted by movement of the shift lever in the second shifting channel; a shift rotor operatively coupled to the shift lever by way of a first transmitting device such that the shift rotor is rotatable by movement of the shift lever in the shifting channels; a plurality of shifting elements operatively coupled to the shift rotor by way of respective coupling elements; and a preselection device operatively coupled to the shift lever by way of a second transmitting device such that movement of the shift lever between the first and second shifting channels is transmitted to the coupling elements.

This and other objects have also been achieved according to the present invention by providing a method of shifting a manual transmission having a plurality of forward gears and at least one reverse gear, a shift lever movable in a first shifting channel, movable in a second shifting channel, and movable between the first and second shifting channels, a shift rotor operatively coupled to the shift lever by way of a first transmitting device, a plurality of shifting elements operatively coupled to the shift rotor by way of respective coupling elements, and a preselection device operatively coupled to the shift lever by way of a second transmitting device, the method comprising the steps of: moving the shift lever in the first shifting channel to shift between the forward gears by way of the first transmitting device, the shift rotor, the coupling elements, and the shifting elements, moving the shift lever between the first and second shifting channels to rotate the preselection shaft and the coupling elements to a neutral position; and moving the shift lever in the second shifting channel to engage and disengage the reverse gear by way of the first transmitting device, the shift rotor, the coupling elements, and the shifting elements.

A very high protection against faulty shifting and unintentional shifting of the reverse gear is achieved in that the forward gears of the manual transmission are shifted by moving the shift lever in a first shifting channel. Independently of this first shifting channel, the reverse gear is shifted in a second shifting channel so that a momentary separation of the shifting function exists for the driver. For engaging the reverse gear or for preselecting the reverse gear channel, the shift lever is moved perpendicularly to the first shifting channel. For this purpose, the shift lever is coupled by way of second transmitting devices with a preselection shaft by means of which coupling elements can be adjusted between the shift fork and the shift rotor. The adjustment of the coupling elements therefore takes place independently of the position or operation of the shift rotor. A shifting arrangement is therefore created in which a secure separation is provided between the operation of the forward gears and the operation of the reverse gear and which the driver can easily carry out when operating the shift lever. In this case, the shifting arrangement can be operated without any support by servo motors which permits considerable savings with respect to components and, in particular, a high-expenditure electronic control system is not necessary.

A shifting arrangement of this type can be constructed in a particularly space-saving manner if the coupling elements are longitudinally guided on the preselection device constructed as a preselection shaft and can be adjusted approximately perpendicularly thereto by means of the second transmitting devices. In this case, the coupling elements can be guided on this preselection shaft in the shifting direction, this movement being caused by the rotation of the shift rotor. The second transmitting devices coupled with the preselection shaft can then advantageously swivel the coupling elements by the rotation of the preselection shaft approximately perpendicularly to the shifting direction.

A particularly advantageous construction of the shifting arrangement is obtained if, during the swivelling by means of the second transmitting device, the coupling elements interact with an adjusting unit which permits a forcedly guided displacement of the coupling elements in the shifting direction. Thus, already during the swivelling of the coupling elements, a shifting operation can be carried out which changes the respective shifting element either into a neutral position or into a reverse-gear position.

It is also possible to construct the coupling element such that it is coupled with the shift rotor by means of two spaced guide members in the respective end positions of the swivel movement. As a result, by means of the first guide member in the first end position of the swivel motion, a shifting movement for the forward gears can be carried out while, by means of the second guide member, in the second shifting channel, the shifting movement for the reverse gear is carried out.

The shifting operation by means of such a shifting arrangement will still be considerably safer if, in addition, locking devices are provided by means of which a shifting of the reverse gear is possible only from defined shifting positions of the manual transmission. As a result, it can be ensured that an engagement of the reverse gear is possible only if the first gear was engaged before.

This locking device can advantageously consist of interacting locking members between the preselection shaft and the shift rotor. In a space-saving manner, these may be arranged inside the shifting arrangement or inside the transmission, in which case a purely mechanically operating lock is conceivable. In a particularly advantageous manner, the locking members may consist of at least one locking disk respectively on the preselection shaft and the shift rotor and of one locking member interacting with these.

These and other objects, features and advantages of the present invention will become more readily apparent from the following detailed description when taken in conjunction with the accompanying drawings.

DETAILED DESCRIPTION OF THE DRAWINGS

Figure 1:
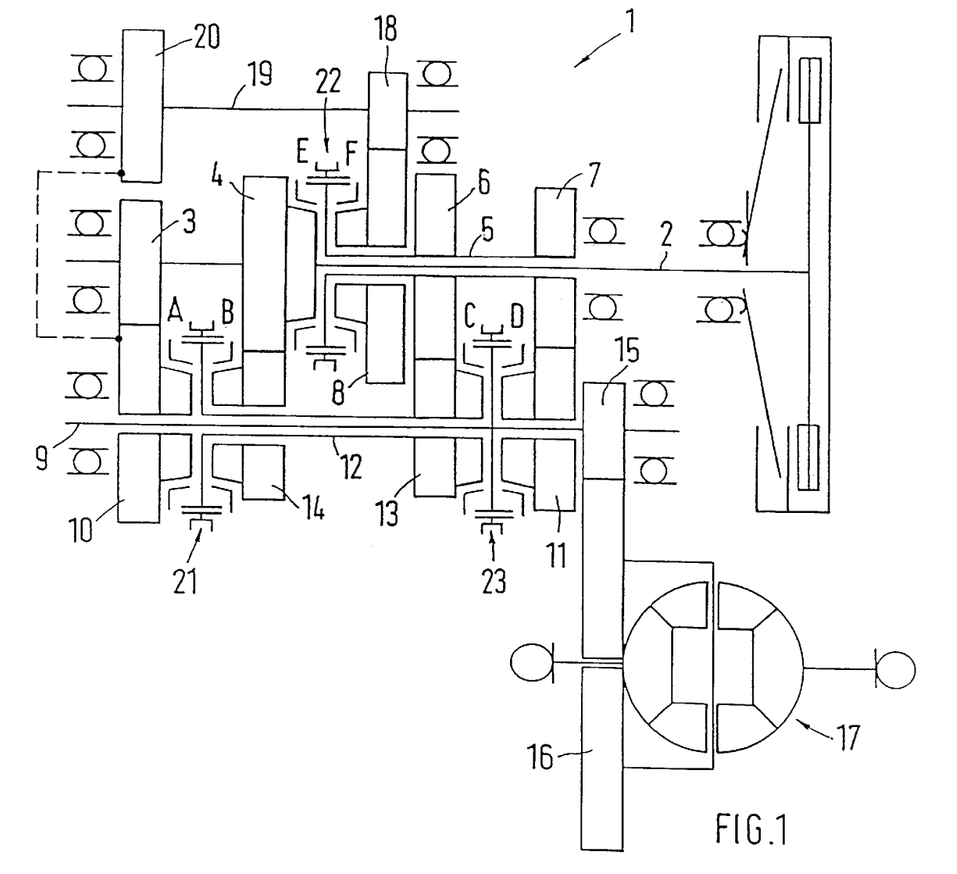
FIG. 1 is a schematic view of the construction of a manual transmission shown as an example.

The manual transmission 1 shown as an example in FIG. 1 has an input shaft 2 with two gear wheels 3, 4 which are constructed as fixed wheels. On the input shaft 2, a first hollow shaft 5 is disposed which is provided with two gear wheels 6, 7 constructed as fixed wheels and with a rotatably disposed loose wheel 8. Parallel to the input shaft 2, an output shaft 9 is disposed in the transmission case which is not shown in detail, two loose wheels 10, 11 and a second hollow shaft 12 being disposed on the output shaft 9. The second hollow shaft 12 is provided with a gear wheel 13 constructed as a fixed wheel and with another gear wheel 14 constructed as a loose wheel. On the end side, the output shaft 9 is provided with an output gear wheel 15 which interacts with the drive wheel 16 of a differential gearing 17. The shafts and the gear wheels directly or indirectly arranged thereon are arranged such that the gear wheel 3 of the input shaft 2 meshes with the loose wheel 10 of the output shaft 9. The second gearwheel 4 of the input shaft constructed as the fixed wheel meshes with the loose wheel 14 of the second hollow shaft 12 disposed on the output shaft 9. The gear wheel 6 arranged on the hollow shaft 5 meshes with the fixed wheel 13 of the second hollow shaft 12 and the gear wheel 7 of the first hollow shaft 5 meshes with the loose wheel 11 of the output shaft 9. The loose wheel 8 disposed on the first hollow shaft 5 meshes with a gear wheel 18 which is fixedly connected with a reverse gear shaft 19. A second gear wheel 20 is also fixedly connected with this reverse gear shaft 19 and meshes with the loose wheel 10 of the output shaft 9.

Figure 2:
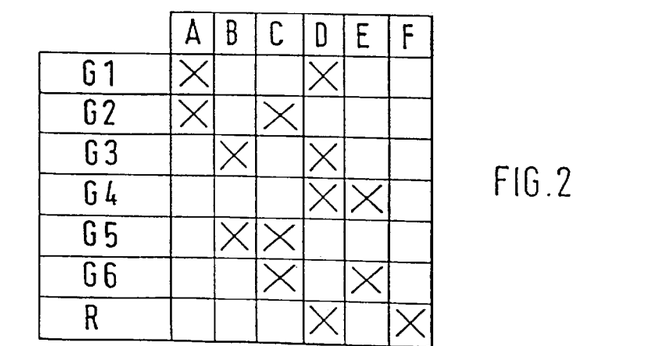
FIG. 2 is a schematic view of an assignment of the transmission gears and the synchronizer clutches of the transmission of FIG. 1.

For shifting the individual gear positions G1 to G6 and R, three double-acting synchronizer clutches 21 to 23 are provided which are known per se and which can be adjusted from a neutral center position into two shifting positions. The first synchronizer clutch 21 is connected with the second hollow shaft 12 and, in a first shifting position A, interacts with the loose wheel 10 and, in a second shifting position B, interacts with the loose wheel 14 in a manner known per se. The second synchronizer clutch 22 is connected with the first hollow shaft 5 and interacts in its first shifting position E with the gear wheel 4 and in its second shifting position F with the loose wheel 8. The third synchronizer clutch 23 is connected with the output shaft 9 and interacts in its first shifting position C with the fixed wheel 13 and in its second shifting position D with the loose wheel 11. By means of this manual transmission shown as an example, six forward positions (G1 to G6) and a reverse position R can be shifted. The corresponding shifting diagram is illustrated in FIG. 2. By means of this transmission illustrated as an example, all gear positions (G1 to G6, R) are shifted by operating two synchronizer clutches respectively. Thus, for example, the reverse gear R is engaged by shifting the synchronizer clutch 23 into its shifting position D and by shifting the synchronizer clutch 22 into its shifting position F. The occurring flux of force is illustrated in FIG. 1. The above-described construction of the transmission is shown only as an example here. A different construction of the transmission is contemplated, according to variously known embodiments. The shifting arrangement described in detail in the following can also easily be used for manual transmissions in which, for each shifting operation, only one synchronizer clutch or similar shifting element is operated.

Figure 3:
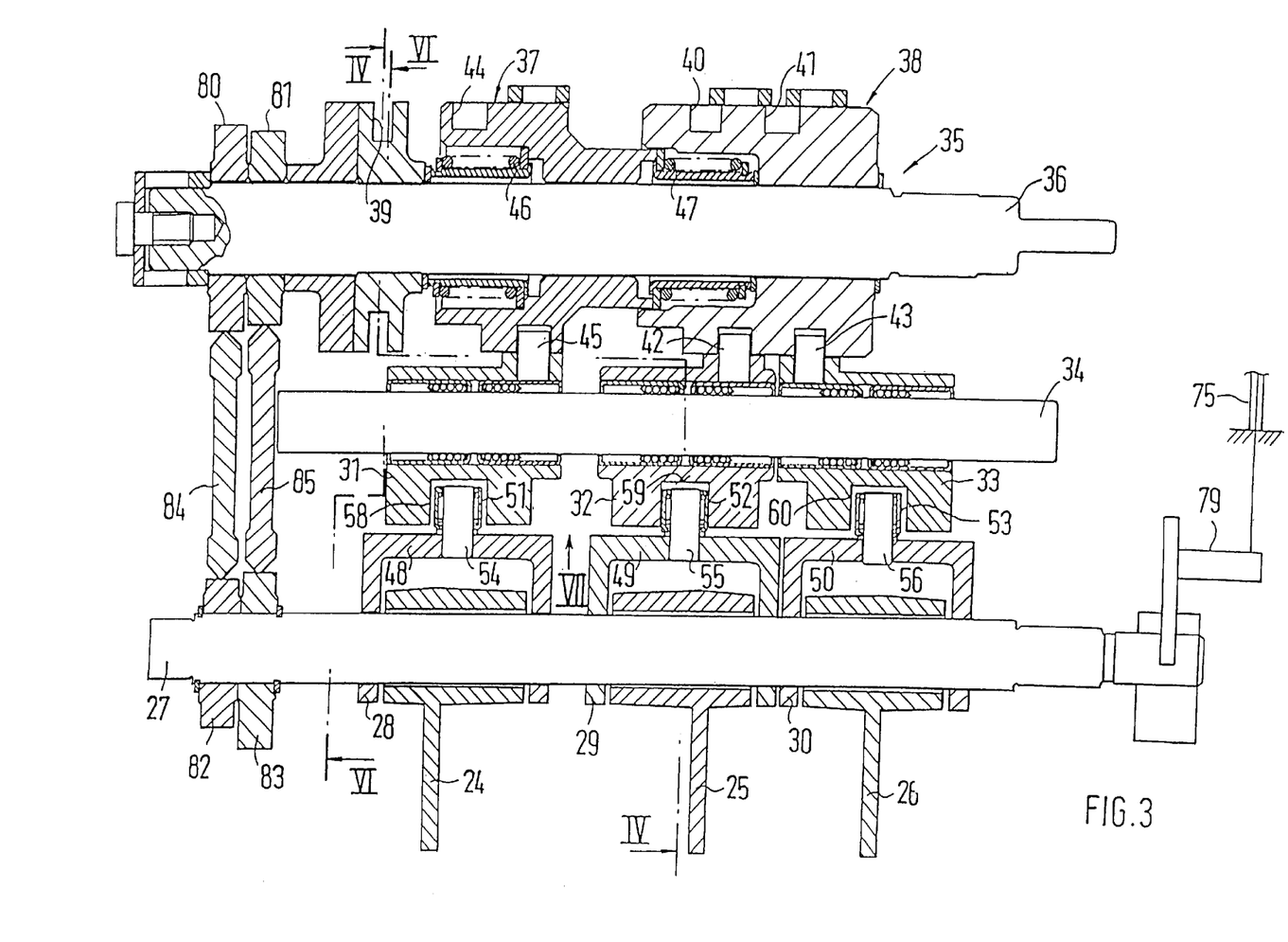
FIG. 3 is a simplified longitudinal partial sectional view of a shifting arrangement according to a preferred embodiment of the present invention.

The operation of the synchronizer clutches 21 to 23 and therefore the shifting of the manual transmission 1 takes place in a manner known per se; specifically by the axial displacement of shift forks 24 to 26 interacting with the synchronizer clutches. However, it is also contemplated to use, instead of the axially displaceable shift forks, known swivel forks whose swivel movement causes a displacement of the synchronizer clutches. As illustrated in FIG. 3, these shift forks 24 to 26 are guided in a longitudinally displaceable manner on a preselection shaft 27. The displacement of the shift forks 24 to 26 takes place by means of bow-shaped coupling elements 28 to 30 which are connected with one intermediate element 31 to 33 respectively. These intermediate elements 31 to 33 are guided in a longitudinally displaceable manner on a guide rod 34 and are coupled with a shift rotor 35. The shift rotor 35 consists essentially of a shifting shaft 36 and two rotor elements 37, 38. On the end side, the shifting shaft 36 is disposed in the transmission case of the manual transmission 1 not shown in detail and is rotated in steps by means of a step-by-step system which is known per se and of which FIG. 3 illustrates only the driving part 39 connected with the shifting shaft 36. The first rotor element 38 is fastened on the shifting shaft 36. On its outer circumference, this rotor element 38 has two surrounding guideways 40, 41 in which one shift finger 42, 43 respectively engages. The surrounding guideways 40, 41 extend around the circumference of the rotor elements with a partially axial course. Shift finger 42 is fixedly connected with the intermediate element 32 and shift finger 43 is connected with the intermediate element 33.

The rotation of the shifting shaft 36 causes the first rotor element 38 to rotate therewith. This rotation of the first rotor element 38 causes the shift finger 42 to slide along guideway 4C, the axial course of the guideway 40 causing the shift finger 42 and the intermediate element 32 connected thereto to move axially. The axial movement of the intermediate element 32 causes the coupling element 29 to move axially, which in turn causes the shift fork 25 to move axially. The shift fork 25 operatively engages the synchronizer clutch 22, which is thereby actuated by the axial movement of the shift fork. The surrounding guideways 40, 41 are configured with a course corresponding to a desired axial movement of the respective shift forks 25, 26 to appropriately operate the respective clutches 22, 23 to shift gears. In a similar manner, a rotation of the shifting shaft 36 is translated into an axial movement of the synchronizer clutch 23, by way of the first rotor element 38, the guideway 41, the shift finger 43, the intermediate element 33, the coupling element 30 and the shift fork 26, which operatively engages the synchronizer clutch 23.

The second rotor element 37 is non-rotatably but axially displaceably disposed on the shifting shaft 36. On its outer circumference, a surrounding guideway 44 is formed into which a shift finger 45 engages which is fastened on the intermediate element 31. The intermediate element 31 interacts by way of the coupling element 28 with the shift fork 24. Similar to the operative connection between guideway 40 and clutch 22 described above, a rotation of the shifting shaft 36 is translated into an axial movement of the synchronizer clutch 21, by way of the second rotor element 37, the guideway 44, the shift finger 45, the intermediate element 31, the coupling element 28 and the shift fork 24, which operatively engages the synchronizer clutch 21. The surrounding guideway 44 is appropriately configured to correspond to a desired axial movement of the shift fork 24 and the clutch 21 to shift gears. The second rotor element is clamped in between two spring elements 46, 47 which permit a slight axial displacement during the shifting operation. By means of this clamping-in and axial displaceability, a secure shifting operation is ensured while two synchronizer clutches are operated simultaneously. Further details regarding the construction of the shift rotor 35 which are not essential to the present invention, are described, for example, in German Patent Application 195 05 323. If, as mentioned above, instead of the transmission construction described as an example, a different construction is used in which, for example, only one synchronizer clutch is adjusted for shifting the transmission gears, the use of two separate rotor elements is not necessary. The shift rotor can then easily be constructed with only one rotor element.

Figures 4, 5:
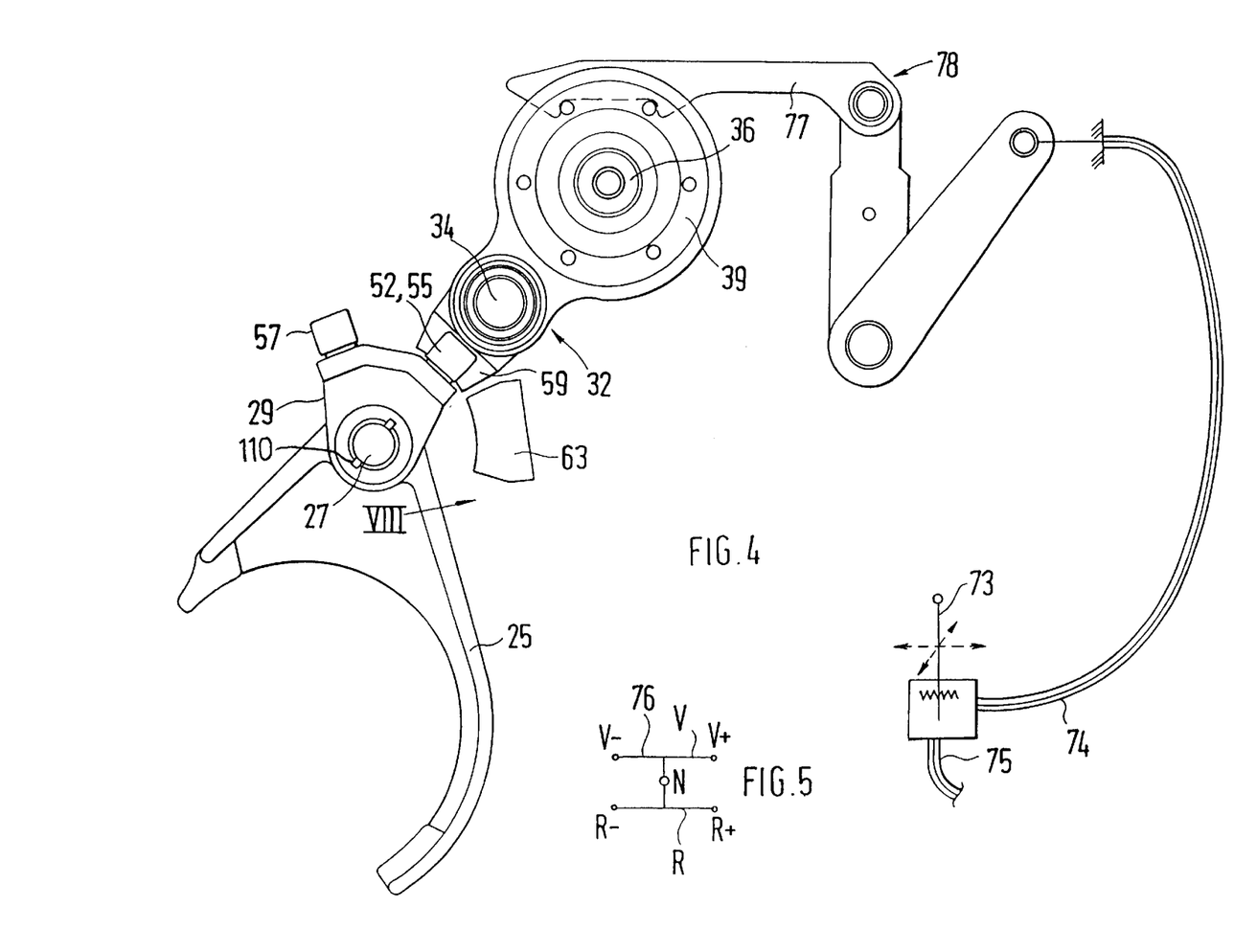
FIG. 4 is a simplified partial cross-sectional view of the shifting arrangement along Line IV—IV of FIG. 3.
FIG. 5 is a schematic representation of the shifting movements on the shift lever.
Figures 6, 7:
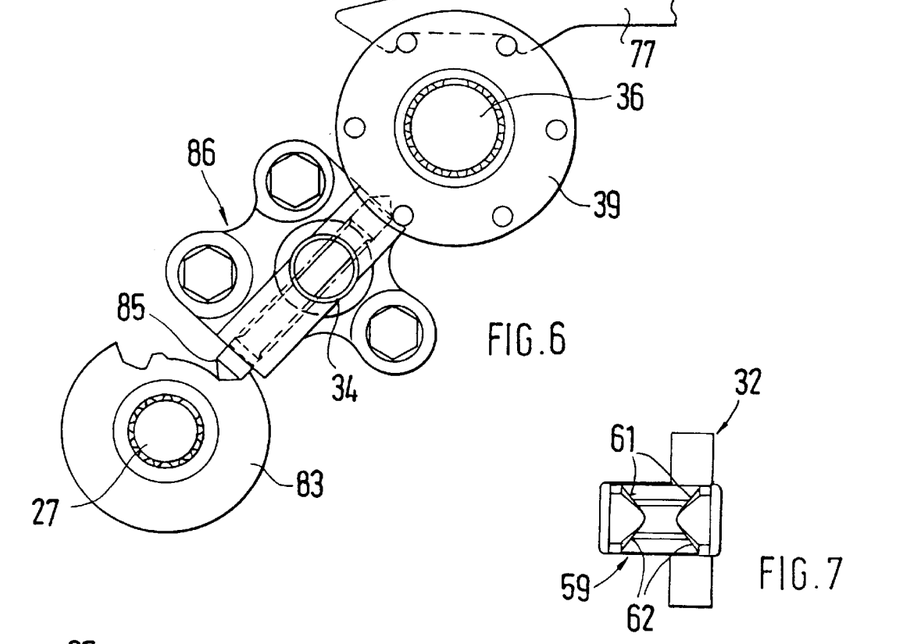
FIG. 6 is another simplified partial cross-sectional view of the shifting arrangement along Line VI—VI of FIG. 3.
FIG. 7 is a view of an intermediate element in the direction of the arrow VII of FIG. 3.
Figure 8:
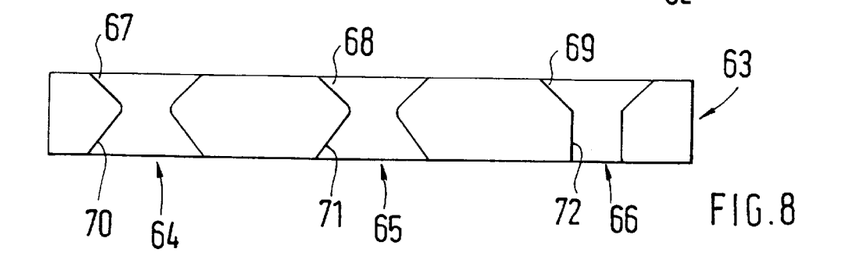
FIG. 8 is a view of the adjusting unit in the direction of the arrow VIII of FIG. 4.

The bow-shaped coupling elements 28 to 30 are non-rotatably but axially displaceably guided on the preselection shaft 27. For this purpose, the coupling elements 28 to 30 and the preselection shaft 27 have a keying 110, as illustrated in FIG. 4. On their transverse bow 48 to 50, the coupling elements 28 to 30 each have a guide member 54 to 56 equipped with a roll 51 to 53. The coupling elements 29 and 30 which are operative during the shifting of the reverse gear R and of which for the purpose of clarity only the coupling element 29 is shown in FIG. 4, are each provided with a second guide member 57 offset in the swivel direction. The guide members 54 to 57 each interact with a guide groove 58 to 60 of the intermediate elements 31 to 33. As illustrated in the example of the intermediate element 32 in FIG. 7, which view is taken in the direction of arrow VII in FIG. 3, these guide grooves 58 to 60 have mutually opposite approximately V-shaped guide surfaces 61, 62 which are engaged by the rolls 51 to 53. In the case of the viewing direction of FIG. 4, a comb-shaped case-fixed adjusting unit 63 is arranged below the intermediate elements 31 to 33. This adjusting unit 63 which is illustrated in detail in FIG. 8, which view is taken in the direction of arrow VIII in FIG. 4, has three guideways 64 to 66 which are each assigned to a coupling element 28 to 30 or its guide members 54 to 57. In this case, the guideways are arranged such that, during the rotation of the preselection shaft 27, the guide members 54 to 56 are swivelled out of the guide grooves 58 to 60 of the respective intermediate elements and are, in each case, moved into one of the guideways 64 to 66. The three guideways 64 to 66 each have a V-shaped inlet area 67 to 69 by means of which, independently of their previous starting position, the guide members of the coupling elements are pressed into a center position or are held in it, which center position corresponds to the neutral position of the respective assigned synchronizer clutch. The inlet areas 67 and 68 of the guideways 64 and 65 are, in each case, adjoined by an inversely V-shaped second guide area 70, 71. The inlet area 69 of the guideway 66 changes into a guide area 72 with parallel walls.

By way of two cable pulls 74, 75 serving as transmitting devices, the shift lever 73 of the motor vehicle is connected with the shift rotor 35 or the preselection shaft 27. Movements of the shift lever within the first shifting channel 76, which extends, for example, in the driving direction of the motor vehicle, are transmitted by way of the first cable pull 74 to the pawl 77 of the step-by-step system 78. The movements of the shift lever in the first shifting channel or in parallel thereto are therefore transmitted by way of the pawl 77 of the step-by-step system 78 to the driving part 39 on the shift rotor 35 which is thus adjusted in one of its two rotating directions. Movements of the shift lever 73 perpendicularly to the first shifting channel 76 are transmitted by way of the second cable pull 75 to a lever 79 coupled with the preselection shaft 27 so that the preselection shaft 27 is rotated by movement of the shift lever 73 perpendicularly to the first shifting channel.

In this embodiment, the step-by-step system 78 is designed such that, during each individual shifting operation, that is, during each movement of the shift lever into or in parallel to the first shifting channel from the neutral center position into one of the two end positions, a rotation of the shift rotor by 60° is caused. By means of spring elements not shown in detail, the shift lever is moved after each shifting operation back into its neutral center position relative to the first shifting channel, from which, by another forward or backward movement, the next shifting operation is triggered. The guideways in the two rotor elements are arranged such that the six forward gears and the reverse gear are shifted in 60°-steps of the shift rotor. In this case, the operation of the reverse gear R and of the sixth gear G6 take place in the same angular position of the shift rotor, the corresponding guideways being situated in parallel in this angle area. The shifting of the forward gears G1 to G6 takes place by rotating the shift rotor 35 if the preselection shaft 27 is rotated into its first end position V. By moving the shift lever 73 from its center position into a shifting direction V+, an upshifting of the gears takes place. By moving the shift lever 73 from the center position into the opposite direction V−, a downshifting takes place. When, by the transverse movement of the shift lever 73 perpendicularly to the first shifting channel 76, the preselection shaft 27 is rotated into its intermediate position N, the coupling elements 28 to 30 are swivelled such that the guide members 54–56 are swivelled out of the guide grooves 58 to 60 in the intermediate elements 31 to 33 and into the center area of the adjusting unit 63. The guide grooves 58 to 60 in the intermediate elements 31 to 33 and the guideways 64 to 66 in the adjusting unit 63 are spatially assigned to one another such that the guide members are swivelled from the respective assigned guide groove in the intermediate element into the pertaining guideway of the adjusting unit. In this case, these are assigned to one another such that by means of a forced guiding of the guide members in the guideways of the adjusting unit, all coupling elements are displaced from their respective shifting position into the neutral position. This neutral position of the transmission can be engaged from each previously engaged forward position G1 to G6 by a transverse movement of the shift lever. When the shift lever is moved from the position N into the first shifting channel, the guide members are swivelled out of the adjusting unit and rotated back into the guide grooves of the intermediate elements. If the shift rotor was not rotated in the interim, the coupling elements are adjusted by means of the guideways 62 of the intermediate elements back into their original position so that the originally shifted gear is engaged again.

For the shifting of the reverse gear R, by means of the further swivelling of the shift lever into the shifting position R, the guide members are swivelled out of the center area of the adjusting unit to such an extent that, by means of the shaping of the guide grooves 70, 71, a forward and backward movement of the coupled elements is possible which are assigned to the reverse gear. In this case, the second guide members 57 on the coupling elements assigned to the reverse gear R are rotated to such an extent that they mesh with the guide grooves of the intermediate elements. The additional coupling element remains in its neutral position, that is, the guide member remains within the parallel wall area of the guide area 72. By the movement of the shift lever out of this center position into the shifting position R+, the shifting shaft is rotated so that a shifting takes place from the first gear G1 into the reverse gear R. By the movement of the shift lever from the center position back into the shifting position R−, the shift rotor is moved back from the shifting position R into the shifting position of the first gear G1. For the engaging of the first gear G1, subsequently the rotation of the preselection shaft 27 into the shifting position V is required in which all guide members engage again with the respective intermediate element. The forward gears G1 to G6 can then be shifted—as described above—by the movement of the shift lever in the first shifting channel. The movements of the shift lever, which are similar to those of an H-shifting pattern of a conventional shifting arrangement, are illustrated schematically in FIG. 5. However, as a modification in this respect, the shift lever returns into the center position after each shifting movement in the first shifting channel or the parallel reverse gear shifting channel.

In this embodiment, two locking disks 80, 81 are non-rotatably arranged on the shifting shaft 36 which are opposed by locking disks 82, 83 coupled non-rotatably with the preselection shaft 27. Between the mutually opposite locking disks 80 to 83, two locking pins 84, 85 are arranged which are longitudinally guided in a case-fixed guide 86. The locking disks 80 to 83 and the locking pins 84 and 85 are assigned to one another such that the locking disk 80 on the shifting shaft 36, the locking pin 84 and the locking disk 82 on the preselection shaft 27 interact. Simultaneously, the locking disk 81 on the shifting shaft 36 interacts with the locking pin 85, which interacts with the locking disk 83 on the preselection shaft 27. On their circumferential surface, locking disks 80 to 83 have mutually assigned indentations and elevations which will be explained in detail in the following and as a result of which a rotation of the two shafts relative to one another is possible only in the case of predetermined shifting positions or rotational positions of the shafts.

The elevations and indentations on the locking disks 80 to 83 are assigned to the respective rotational positions of the shift rotor or to the shifting positions of the manual transmission. The following description of the individual locking disks is assigned to the corresponding rotating positions of the shift rotor or to the shifting positions of the transmission. In this case, the individual angle and circumferences areas are each assigned to one transmission position. The locking disks 80 to 83 are arranged on the shifting shaft 36 or the preselection shaft 27 in such a manner that, in the case of a correspondingly engaged transmission gear, the assigned positions of the locking disks are situated in the area of the locking pin 84 or 85. The locking disk 80 has a first indentation 89 which is assigned to the first forward gear G1. In this embodiment and in the selected viewing direction, the individual transmission gears are continuously arranged clockwise. Starting out from the shifting position for the sixth gear G6 or the reverse gear R, a second flatter indentation 90 extends clockwise to the first indentation 89.

The second locking disk 81 arranged on the shifting shaft has a first indentation 91 which is assigned to the first forward gear G1. It is adjoined by an indentation 92 of a lower depth which continues clockwise and which extends to the shifting position G6 or R. The locking disks 82, 83 on the preselection shaft 27 essentially have three assigned areas. A first shifting area V corresponds to the first shifting channel on the shift lever. In this shifting area of the preselection shaft 27, the forward gears Gl to G6 are shifted by means of the rotation of the shift shaft. This is followed by a second area N which corresponds to the neutral position of the manual transmission. In this shifting position N of the preselection shaft, the guide members are situated in the center position within the adjusting unit or the guide grooves. This area is followed by the area R which corresponds to the second end position of the preselection shaft and in which the shifting of the reverse gear takes place.

The locking disk 82 has a first indentation 93 between the shifting positions V and N and, separated therefrom by a step 94 with a full disk diameter, another indentation 95 of a lower depth. This indentation 95 is assigned to the shifting area R.

The locking disk 83 has an indentation 96 in the area of the shifting position R and another indented section 97 of a lower depth between the shifting ranges N and V. Between the indentation 96 and the indented section 97, a step 98 is arranged.

Figures 9A, 9B, 9C:
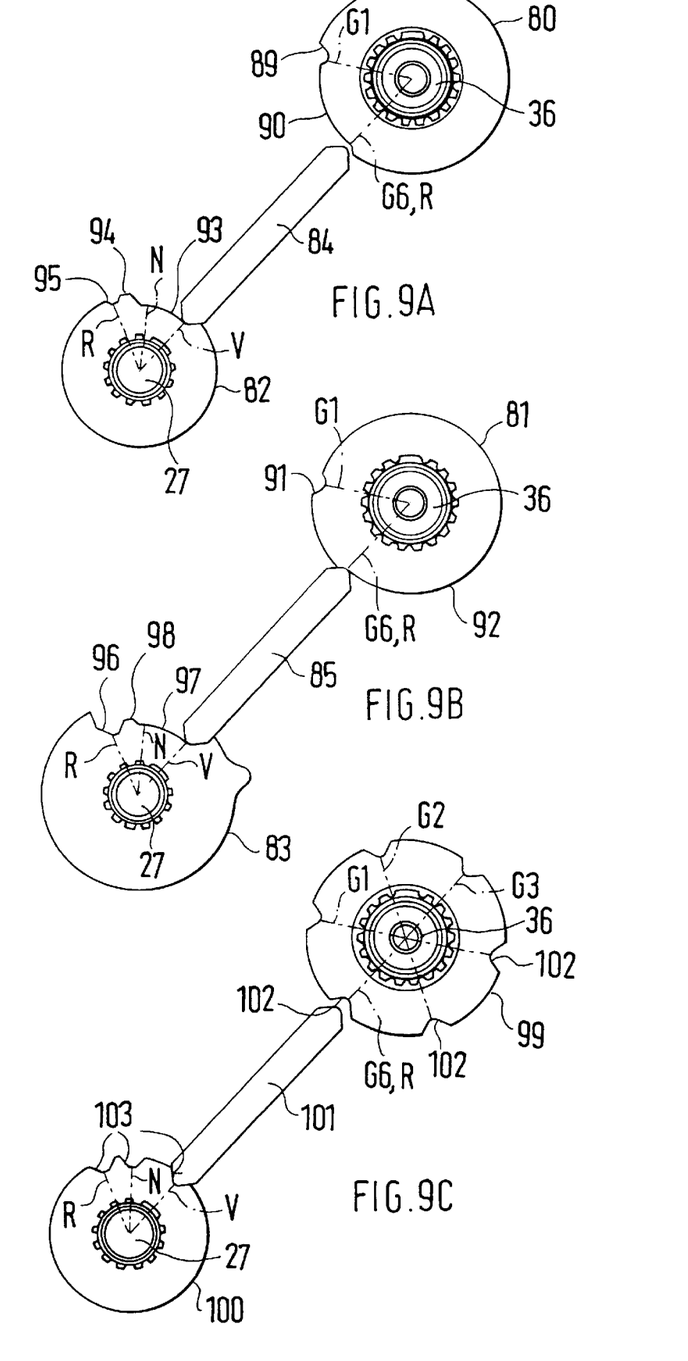
FIGS. 9a to 9c are simplified views of the mutually assigned locking disks and locking pins.

The locking pins 84 and 85 are longitudinally movably guided between the two mutually assigned locking disks 80 and 82 or 81 and 83, in each case at least one end of the locking pin being guided along the outer circumference or along the base of the indentations of one of the locking disks. When the locking disk 82 and therefore the preselection shaft 27, as illustrated in FIG. 9a, is situated in position V, the locking pin 84 rests against the base of the indentation 93. In this case, the length of the locking pin 84 is dimensioned such that the locking disk 80 and therefore the shifting shaft 36 is freely movable along the whole rotating range. Simultaneously, in each position of the locking disk 80, a rotation of the preselection shaft 27 and thus of the locking disk 82 from position V into position N, that is, the neutral position of the manual transmission, is possible. When, for the shifting of the reverse gear R, the preselection shaft is to be rotated into its position R, the locking pin 84 is lifted by means of the step 94 between the positions R and N. Because of the mutually assigned dimensions, this is possible only if the shifting shaft is in position G1; that is, if the locking pin 84 can dip into the indentation 89. In all other positions of the shifting shaft, the locking pin 84 is pressed by means of the step 94 against the circumference or the base of the indentation 90, the step being unable to pass through under the locking pin. A further rotation is therefore not possible. The engaging of the reverse gear therefore becomes possible only if the rotor shaft was previously in position G1 of the first forward gear. This prevents the reverse gear from being accidentally engaged from one of the other forward gears G2 to G6. A shifting-back from a gear different than the first gear G1 by means of a transverse movement of the shift lever, that is, by an exclusive movement of the preselection shaft, is also prevented. In order to rotate the preselection shaft from the position R into the position N or V, the rotor shaft must previously be rotated by the shifting back (R–) of the shift lever into the position of the first transmission gear G1. It is only then that the locking pin 84 can be lifted by way of the step 94 of the locking disk 82 and can be moved into the area of the indentation 93. A multiple upshifting or further rotation of the rotor shaft by movements of the shift lever in the R-channel is not possible because of the locking.

By means of the locking disks 81 and 83, it is prevented that, as the result of a transverse movement of the shift lever from the engaged reverse gear without any rotation of the rotor shaft a neutral position can be reached. In order to shift from the reverse gear R into neutral, an intentional disengaging of the reverse gear is required beforehand by the operation of the (R–) shift lever. When the reverse gear R is engaged, the locking disk 81 is in the position illustrated in FIG. 9b. In this case, the locking disk 83 is rotated in contrast to FIG. 9b such that the locking pin 85 projects into the indentation 96. If, from this position, a shift is to take place to neutral N or to the first gear G, the locking pin 85 is lifted by means of the step 98. In this case, a sufficient clearance for the locking pin 85 will exist only if the rotor shaft and therefore the locking disk 81 is rotated beforehand into position G1 by a corresponding moving of the shift lever. In all other positions of the rotor shaft, the locking pin 85 is pressed by means of the step 98 against the base of the indentation 92, the step 98 being unable to be guided past the locking pin 85. A further rotation of the rotor shaft by a multiple operation of the shift lever in the direction R– is therefore not possible.

By means of two additional locking disks 99 and 100, which are arranged on the rotor shaft or the preselection shaft, as well as by means of another locking pin 101 which is longitudinally movable guided in-between, additional safety functions can be integrated. In this case, the locking disk 99 has at respective 600 distances an indentation 102 which corresponds to the shifting positions G1 to G6 and R.

The locking disk 100 has three indentations 103 to 105 which correspond to the shifting positions V, N and R. In this case, the dimensions of the indentations and the length of the locking pin are coordinated with one another such that a simultaneous movement of both shafts is prevented. A movement or rotation of the two shafts is possible only when the locking pin is situated in an indentation of the locking disk 99 or of the locking disk 100. This ensures that the shift lever of the motor vehicle can be moved only in one operating direction (in the longitudinal direction or the transverse direction of the motor vehicle). A diagonal shifting, for example, from the center position of the first shifting channel into the position R+ is therefore prevented.

With respect to the length of the locking pin 85 and the diameter of the locking disk 92 as well as its indentations 91 and 92, the indentations 96 and 97 on the locking disk 83 are dimensioned such that they simultaneously form an end stop for the rotation of the preselection shaft 27. From the shifting position R, a rotation is therefore possible only in the direction of the shifting positions N and V. A rotation of the preselection shaft from the shifting position R into the opposite direction is not possible. The same applies analogously to the opposite end position V.

Figure 10:
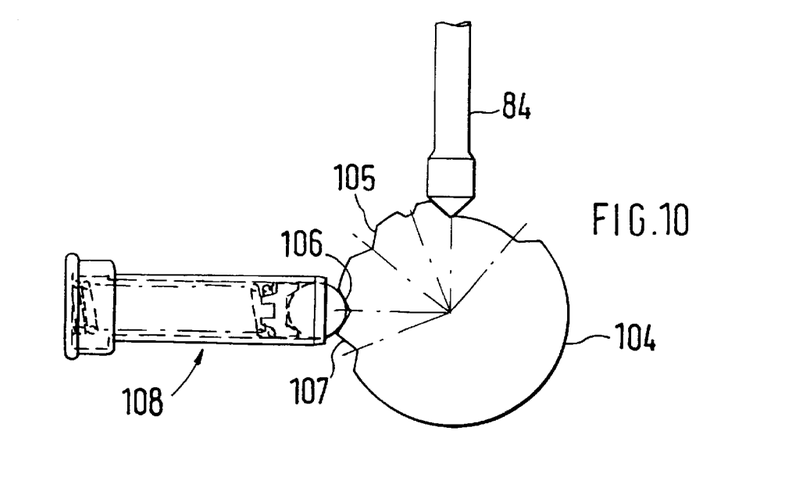
FIG. 10 is a simplified view of a modified locking disk.

By means of the modification of the locking disk 82 having the reference number 104 in FIG. 10, a locking of the preselection shaft 27 is possible in shifting positions V, N and R. For this purpose, the locking disk 104 has three additional indentations 105 to 107 which are offset by a defined angle with respect to the indentations 93 and 95 and are also assigned to the above-described shifting positions. In the case of a corresponding rotational position of the preselection shaft, a spring-loaded locking member 108, by which the corresponding shifting position is fixed, projects into these indentations so that an unintentional rotation is prevented. For the arbitrary rotation of the preselection shaft, the locking forces of the spring-loaded locking member must be overcome.

The number, assignment and shape of the locking disks is shown here only in the manner of an example. A different arrangement, number or shape is easily conceivable. In this case particularly individual functions can be supplemented or left out if other safety functions or shifting functions are required.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A shifting arrangement for a manual transmission having a plurality of forward gears and at least one reverse gear, said shifting arrangement comprising:
    a shift lever movable in a first shifting channel, movable in a second shifting channel, and movable between said first and second shifting channels, at least said reverse gear being shifted by movement of the shift lever in the second shifting channel;
    a shift rotor operatively coupled to said shift lever by way of a first transmitting device such that said shift rotor is rotatable by movement of said shift lever in said shifting channels;
    a plurality of shifting elements operatively coupled to said shift rotor by way of respective coupling elements; and
    a preselection device operatively coupled to said shift lever by way of a second transmitting device such that movement of said shift lever between said first and second shifting channels is transmitted to said coupling elements.

2. A shifting arrangement according to claim 1, wherein said preselection device is a preselection shaft, said coupling elements being guided on said preselection shaft and being adjustable approximately perpendicularly thereto by means of the second transmitting devices.

3. A shifting arrangement according to claim 2, wherein said coupling elements are rotatably fixed with respect to the preselection shaft and axially movable with respect to the preselection shaft, said preselection shaft being rotatable by said second transmitting device to swivel said coupling elements about said preselection shaft.

4. A shifting arrangement according to claim 3, further comprising an adjusting unit arranged to receive said coupling elements when swivelled about the preselection shaft, said adjusting unit being configured to guide said coupling elements into a defined axial position on said preselection shaft.

5. A shifting arrangement according to claim 4, wherein each of said coupling elements further comprises a guide member by means of which the shifting elements are operatively coupled to said shift rotor, said adjusting unit being arranged and configured to receive said guide member when the coupling elements are swivelled about the preselection shaft.

6. A shifting arrangement according to claim 4, wherein guideways are constructed on the adjusting unit by means of which at least some of the coupling elements are guided into a neutral position.

7. A shifting arrangement according to claim 1, wherein the coupling elements are adjustable into a second swivelling position in which shifting operations can be triggered.

8. A shifting arrangement according to claim 1, wherein at least the coupling element used for shifting the reverse gear further comprises two spaced guide members, one of said guide members being connected with the shift rotor during shifting of the forward gears.

9. A shifting arrangement according to claim 1, wherein said reverse gear is engaged and disengaged by moving said shift lever in said second shifting channel, said second shifting channel being arranged parallel to said first shifting channel.

10. A shifting arrangement according to claim 1, wherein locking devices are provided which allow shifting of the reverse gear only from a defined shifting position of the manual transmission.

11. A shifting arrangement according to claim 10, wherein the Locking devices comprise a plurality of interacting locking members arranged between the preselection shaft and the shift rotor.

12. A shifting arrangement according to claim 10, wherein said locking members comprise at least one locking disk arranged on each of the preselection shaft and the shift rotor and a locking pin arranged therebetween.

13. A shifting arrangement according to claim 11, wherein said locking disks are in each case non-rotatably connected with the shift rotor and the preselection shaft and have mutually assigned locking contours with one of indentations and elevations, the assigned locking pin being guided between the locking disks in a longitudinally movable manner.

14. A shifting arrangement for a manual transmission having a plurality of forward gears and at least one reverse gear, said shifting arrangement comprising:

a shift lever movable in a first shifting channel, movable in a second shifting channel, and movable between said first and second shifting channels;

a shift rotor operatively coupled to said shift lever such that said shift rotor is rotatable by movement of said shift lever in said shifting channels;

a plurality of shift forks axially displaceably mounted on a preselection shaft and operatively coupled to said shift rotor by way of respective coupling elements, at least one of said coupling elements being non-rotatably and axially displaceably mounted on said preselection shaft, said shift rotor and said coupling elements being arranged and configured to transmit a rotation of said shift rotor into an axial movement of each of said shift forks between a neutral position and gear engagement positions, said preselection shaft being operatively coupled to said shift lever such that movement of said shift lever between said first and second shifting channels rotates said preselection shaft and simultaneously swivels said coupling elements about the preselection shaft.

15. A shifting arrangement according to claim 14, further comprising an adjusting unit arranged to receive said coupling elements when swivelled about the preselection shaft, said adjusting unit being configured to guide said coupling elements into said neutral position.

16. A method of shifting a manual transmission having a plurality of forward gears and at least one reverse gear, a shift lever movable in a first shifting channel, movable in a second shifting channel, and movable between said first and second shifting channels, a shift rotor operatively coupled to said shift lever by way of a first transmitting device, a plurality of shifting elements operatively coupled to said shift rotor by way of respective coupling elements, and a preselection device operatively coupled to said shift lever by way of a second transmitting device, said method comprising the steps of:

moving said shift lever in said first shifting channel to shift between said forward gears by way of said first transmitting device, said shift rotor, said coupling elements, and said shifting elements;

moving said shift lever between said first and second shifting channels to rotate said preselection shaft and said coupling elements to a neutral position; and moving said shift lever in said second shifting channel to engage and disengage said reverse gear by way of said first transmitting device, said shift rotor, said coupling elements, and said shifting elements.

* * * * *